United States Patent
Xie et al.

(10) Patent No.: US 10,224,833 B2
(45) Date of Patent: Mar. 5, 2019

(54) DRIVE SIGNAL MODULATION METHOD OF MODULAR MULTILEVEL CONVERTER AND FAULT ISOLATION METHOD

(71) Applicants: NR ELECTRIC CO., LTD, Jiangsu (CN); NR ENGINEERING CO., LTD, Jiangsu (CN)

(72) Inventors: Yeyuan Xie, Jiangsu (CN); Dongming Cao, Jiangsu (CN); Tiangui Jiang, Jiangsu (CN); Minglian Zhu, Jiangsu (CN); Guanxian Yin, Jiangsu (CN)

(73) Assignees: NR ELECTRIC CO., LTD, Jiangsu (CN); NR ENGINEERING CO., LTD., Jiangsu (CN)

( * ) Notice: Subject to any disclaimer, the term of this patent is extended or adjusted under 35 U.S.C. 154(b) by 0 days.

(21) Appl. No.: 15/579,935

(22) PCT Filed: Jul. 13, 2016

(86) PCT No.: PCT/CN2016/089945
§ 371 (c)(1),
(2) Date: Dec. 5, 2017

(87) PCT Pub. No.: WO2017/000924
PCT Pub. Date: Jan. 5, 2017

(65) Prior Publication Data
US 2018/0226900 A1    Aug. 9, 2018

(30) Foreign Application Priority Data
Jul. 1, 2015 (CN) .......................... 2015 1 0379627

(51) Int. Cl.
*H02M 7/5387* (2007.01)
*H02M 7/219* (2006.01)
(Continued)

(52) U.S. Cl.
CPC .......... *H02M 7/5387* (2013.01); *G06F 13/00* (2013.01); *H01M 10/4257* (2013.01);
(Continued)

(58) Field of Classification Search
CPC ............ H02P 2101/30; H01M 10/4257; G06F 13/00; H02J 7/0021; H02M 7/219;
(Continued)

(56) References Cited

U.S. PATENT DOCUMENTS 9,112,422 B1 * 8/2015 Vinciarelli ........ H02M 3/33507
9,893,633 B1 * 2/2018 Li ..................... H02M 3/33546
(Continued)

FOREIGN PATENT DOCUMENTS

CN    102739030    10/2012
CN    103248255    8/2013
(Continued)

OTHER PUBLICATIONS

"International Search Report (Form PCT/ISA/210)", dated Oct. 25, 2016, with English translation thereof, pp. 1-4.

*Primary Examiner* — Arnold Kinkead
(74) *Attorney, Agent, or Firm* — JCIPRNET

(57) ABSTRACT

Disclosed are a modulation method of a modular multilevel converter and a fault isolation method of a submodule unit. The modulation method comprises a first mode and a second mode, and the first mode and the second mode operate cyclically. In the first mode, a first power semiconductor switch and a second power semiconductor switch are turned on alternately, while a third power semiconductor switch is turned off normally and a fourth power semiconductor switch is turned on normally. In the second mode, the third power semiconductor switch and the fourth power semiconductor switch are turned on alternately, while the first power semiconductor switch is turned on normally and the second
(Continued)

Full-Bridge Submodule Unit power semiconductor switch is turned off normally. The method enables junction temperatures of the power semiconductor switches used to be equalized, increases an operation safety margin of the converter, effectively increase the capacity of the converter without increasing engineering costs, and achieve better performance in both economic efficiency and technicality.

10 Claims, 2 Drawing Sheets

(51) Int. Cl.
*H02J 7/00* (2006.01)
*H02M 3/00* (2006.01)
*H02M 3/139* (2006.01)
*H01M 10/42* (2006.01)
*G06F 13/00* (2006.01)
*H02M 3/137* (2006.01)
*H02M 7/00* (2006.01)
*H02M 1/32* (2007.01)
*H02M 7/483* (2007.01)

(52) U.S. Cl.
CPC .......... *H02J 7/0021* (2013.01); *H02M 1/32* (2013.01); *H02M 3/00* (2013.01); *H02M 3/137* (2013.01); *H02M 3/139* (2013.01); *H02M 7/00* (2013.01); *H02M 7/219* (2013.01); *H02M 2001/325* (2013.01); *H02M 2001/327* (2013.01); *H02M 2007/4835* (2013.01)

(58) Field of Classification Search
CPC .......... H02M 7/00; H02M 3/00; H02M 3/137; H02M 3/139; H02M 2001/327; H02M 2001/325; H02M 2007/4835; H02M 7/5387; H02M 1/32
USPC .......... 363/56.02, 65, 78; 318/701
See application file for complete search history.

(56) References Cited

U.S. PATENT DOCUMENTS

2004/0024937 A1* 2/2004 Duncan ............... H02M 7/003
710/100
2011/0019449 A1 1/2011 Katoh et al.

FOREIGN PATENT DOCUMENTS

CN 104393780 3/2015
CN 104410260 3/2015
CN 104617803 5/2015

* cited by examiner

DRIVE SIGNAL MODULATION METHOD OF MODULAR MULTILEVEL CONVERTER AND FAULT ISOLATION METHOD

CROSS-REFERENCE TO RELATED APPLICATION

This application is a 371 application of the international PCT application serial no. PCT/CN2016/089945, filed on Jul. 13, 2016, which claims the priority benefit of China application no. 201510379627.7, filed on Jul. 1, 2015. The entirety of each of the above-mentioned patent applications is hereby incorporated by reference herein and made a part of this specification.

BACKGROUND OF THE INVENTION

1. Field of the Invention

The present invention relates to the field of VSC-HVDC, and particularly to a drive signal modulation method of a modular multilevel converter and a fault isolation method.

2. Description of Related Art

The emergence of a modular multilevel converter (MMC) enables successful application of a multilevel converter in the field of VSC-HVDC. The converter of the MMC adopts a modular design and is composed of several basic unit modules having an identical structure in series, each of the modules being referred to as a converter module unit. By increasing the number of series modules and a current level in the converter, the converter can be applied to those occasions at different voltage and power levels.

However, a traditional half-bridge module unit has an inherent defect in which a direct current (DC) fault cannot be effectively handled, and a full-bridge module capable of suppressing a DC fault current also has problems such as large losses and high costs. Thus, how to optimize the performance of the MMC becomes a key technical factor for solving the problems in DC interconnection.

In view of this, the present inventors have conducted investigations and improvements on a drive signal modulation method of a modular multilevel converter, resulting in the present application.

SUMMARY OF THE INVENTION

An object of the present invention is to provide a drive signal modulation method of a modular multilevel converter and a fault isolation method. The drive signal modulation method of a modular multilevel converter can reduce thermal stress of a power semiconductor switch in the converter, increase the capacity of the converter, overcome shortcomings of a full-bridge submodule, and achieve better performance in both economic efficiency and technicality. The fault isolation method of a submodule unit can flexibly select a drive modulation method to effectively isolate a broken-down switching transistor. The method does not influence operation of the system and also reduces a fault rate of the submodule unit, and the availability of the overall system is increased.

To achieve the above object, the solution of the present invention is: a drive signal modulation method of a modular multilevel converter, the modular multilevel converter including at least one bridge arm, the bridge arm including at least one full-bridge submodule unit, the full-bridge submodule unit including a first power semiconductor switch, a second power semiconductor switch, a third power semiconductor switch and a fourth power semiconductor switch, wherein:

the drive signal modulation method includes a first mode and a second mode; the full-bridge submodule unit firstly enters the first mode, then enters the second mode, re-enters the first mode and so on; or firstly enters the second mode, then enters the first mode, re-enters the second mode and so on;

in the first mode, an alternate drive signal is applied to the first power semiconductor switch and the second power semiconductor switch, such that the first power semiconductor switch and the second power semiconductor switch are turned on alternately in the same time sequence, while a complementary drive signal is applied to the third power semiconductor switch and the fourth power semiconductor switch, such that the third power semiconductor switch is turned off normally and the fourth power semiconductor switch is turned on normally; and in the second mode, the alternate drive signal is applied to the third power semiconductor switch and the fourth power semiconductor switch, such that the third power semiconductor switch and the fourth power semiconductor switch are turned on alternately in the same time sequence, while the complementary drive signal is applied to the first power semiconductor switch and the second power semiconductor switch, such that the first power semiconductor switch is turned on normally and the fourth power semiconductor switch is turned off normally.

Further, the first power semiconductor switch includes a switching transistor T1 and a freewheel diode D1 in anti-parallel with the switching transistor T1; the second power semiconductor switch includes a switching transistor T2 and a freewheel diode D2 in anti-parallel with the switching transistor T2; the third power semiconductor switch includes a switching transistor T3 and a freewheel diode D3 in anti-parallel with the switching transistor T3; and the fourth power semiconductor switch includes a switching transistor T4 and a freewheel diode D4 in anti-parallel with the switching transistor T4.

Further, each of the switching transistors T1 to T4 assumes an IGBT, an IGCT, a GTO, or a MOSFET.

Further, the drive signal modulation method includes the following steps:

1) a capacitor discharge state in the first mode: an on-signal is applied to the switching transistors T1 and T4, an off-signal is applied to the switching transistors T2 and T3, and the switching transistors T1 and T4 are turned on and an energy storage element C1 is discharged, at a forward current;

2) a forward bypass state in the first mode: an on-signal is applied to the switching transistors T2 and T4, an off-signal is applied to the switching transistors T1 and T3, and the freewheel diode D2 and the switching transistor T4 are turned on and the full-bridge submodule unit is bypassed, at a forward current;

3) a capacitor discharge state in the first mode: an on-signal is applied to the switching transistors T1 and T4, an off-signal is applied to the switching transistors T2 and T3, and the freewheel diodes D1 and D4 are turned on and the energy storage element C1 is charged, at a reverse current;

4) a reverse bypass state in the first mode: an on-signal is applied to the switching transistors T2 and T4, an off-signal is applied to the switching transistors T1 and T3, and the switching transistor T2 and the freewheel diode D4 are turned on and the full-bridge submodule unit is bypassed, at a reverse current;

5) capacitor discharge state in the second mode: an on-signal is applied to the switching transistors T1 and T4, an off-signal is applied to the switching transistors T2 and T3, and the switching transistors T1 and T4 are turned on and the energy storage element C1 is discharged, at a forward current;

6) a forward bypass state in the second mode: an on-signal is applied to the switching transistors T1 and T3, an off-signal is applied to the switching transistors T2 and T4, and the switching transistor T1 and the freewheel diode D3 are turned on and the full-bridge submodule unit is bypassed, at a forward current;

7) a capacitor discharge state in the second mode: an on-signal is applied to the switching transistors T1 and T4, an off-signal is applied to the switching transistors T2 and T3, and the freewheel diodes D1 and D4 are turned on and the energy storage element C1 is charged, at a reverse current; and 8) a reverse bypass state in the second mode: an on-signal is applied to the switching transistors T1 and T3, an off-signal is applied to the switching transistors T2 and T4, and the freewheel diode D1 and the switching transistor T3 are turned on and the full-bridge submodule unit is bypassed, at a reverse current.

To solve the above technical problem, another technical solution adopted by the present invention is: a fault isolation method of a submodule unit, the submodule unit being a full-bridge submodule unit, wherein when the drive signal modulation method of a modular multilevel converter described above is used to perform modulation, if a second power semiconductor switch or a third power semiconductor switch in the full-bridge submodule unit breaks down or if a drive circuit of the second power semiconductor switch or the third power semiconductor switch breaks down, the broken-down power semiconductor switch is isolated by changing the mode of the drive signal modulation, while the full-bridge submodule unit does not stop running.

The present invention enables thermal stress balancing of power semiconductor switches in a submodule by modulating a drive signal, thereby increasing the capacity of a converter, and changes current stress of switching transistors and anti-parallel diodes of the switching transistors by alternating a drive signal in a two-stage mode. Losses of the switching transistors and the anti-parallel diodes thereof are more uniform, junction temperatures of the power semiconductor switches are reduced, and an operation safety margin is greater. The capacity of the converter can be increased by reducing the junction temperatures of the power semiconductor switches.

Since the full-bridge submodule unit has one switching transistor in a blocking state either in the first mode or in the second mode, the present invention can select one of stages 1 and 2 in operation when detecting that any of switching transistors breaks down, where the broken-down switching transistor is set to be in the blocking state, the remaining three switching transistors still normally operate, and the full-bridge submodule unit is not bypassed. When any of switching transistors or a drive circuit thereof breaks down, a drive modulation method can be flexibly selected to effectively isolate the broken-down switching transistor without influencing operation of the system. The full-bridge submodule unit can allow that one switching transistor or a drive circuit thereof breaks down and is not bypassed, thereby reducing a fault rate of the submodule unit and increasing the availability of the overall system.

In summary, compared with the prior art, the advantageous effects of the present invention are that: the present invention can achieve thermal stress balancing of power semiconductor switches in a submodule unit, thereby increasing the capacity of a converter and reducing the cost of unit capacity of the converter; increase an safety margin of the submodule unit and reliability of the system with no increase of investment; and tolerate that any of IGBTs in a full-bridge submodule unit breaks down while normally operating, thereby reducing the risk of bypass of the full-bridge submodule unit and increasing the availability of the system.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
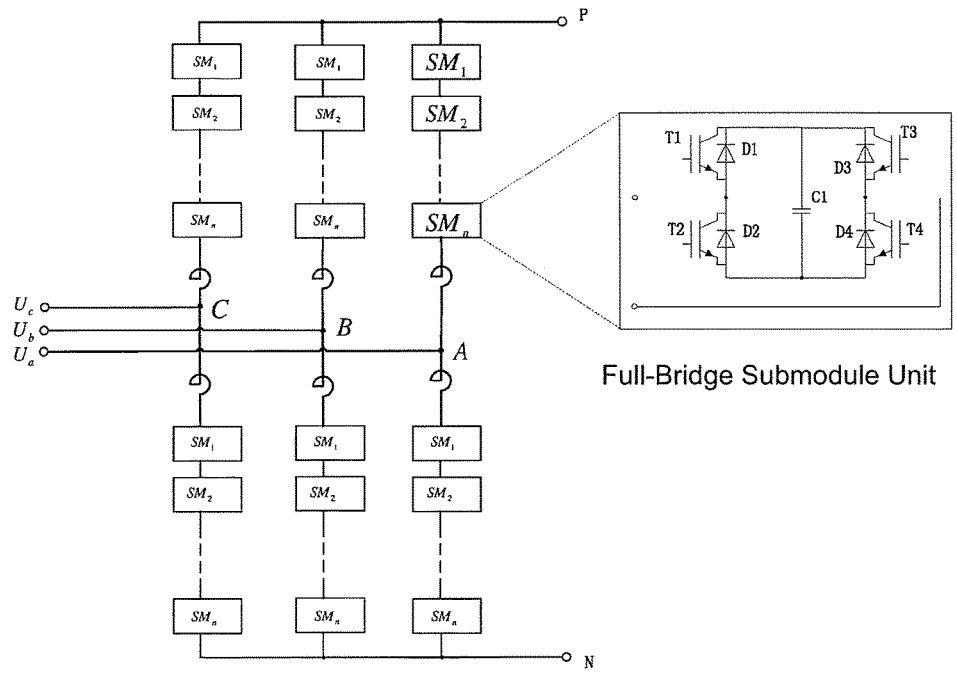
FIG. 1 is a topology of a modular multilevel converter according to the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiment 1

Referring to FIGS. 1, 2A-2D and 3A-3D, shown is a drive signal modulation method of a modular multilevel converter, the modular multilevel converter including at least one bridge arm, specifically six bridge arms in the present embodiment, the bridge arm including at least one full-bridge submodule unit, the full-bridge submodule unit including a first power semiconductor switch, a second power semiconductor switch, a third power semiconductor switch and a fourth power semiconductor switch, wherein the drive signal modulation method includes a first mode and a second mode; the full-bridge submodule unit firstly enters the first mode, then enters the second mode, re-enters the first mode and so on, or firstly enters the second mode, then enters the first mode, re-enters the second mode and so on;

in the first mode, an alternate drive signal is applied to the first power semiconductor switch and the second power semiconductor switch, such that the first power semiconductor switch and the second power semiconductor switch are turned on alternately in the same time sequence, while a complementary drive signal is applied to the third power semiconductor switch and the fourth power semiconductor switch, such that the third power semiconductor switch is turned off normally and the fourth power semiconductor switch is turned on normally; and in the second mode, the alternate drive signal is applied to the third power semiconductor switch and the fourth power semiconductor switch, such that the third power semiconductor switch and the fourth power semiconductor switch are turned on alternately in the same time sequence, while the complementary drive signal is applied to the first power semiconductor switch and the second power semiconductor switch, such that the first power semiconductor switch is turned on normally and the fourth power semiconductor switch is turned off normally.

As a preferred embodiment, the first power semiconductor switch includes a switching transistor T1 and a freewheel diode D1 in anti-parallel with the switching transistor T1, the second power semiconductor switch includes a switching transistor T2 and a freewheel diode D2 in anti-parallel with the switching transistor T2, the third power semiconductor switch includes a switching transistor T3 and a freewheel diode D3 in anti-parallel with the switching transistor T3, and the fourth power semiconductor switch includes a switching transistor T4 and a freewheel diode D4 in anti-parallel with the switching transistor T4; and each of the switching transistors T1-T4 assumes an IGBT, an IGCT, a GTO, or a MOSFET.

Figure 2A:
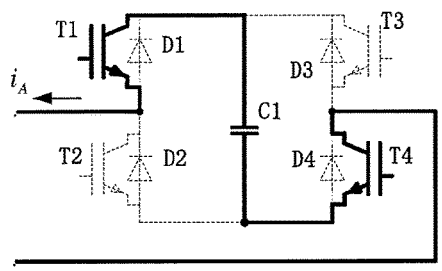
FIGS. 2A-2D are schematic diagrams of various operating conditions of a full-bridge submodule unit at a stage 1 according to the present invention: (2A) forward current discharge loop; (2B) forward current bypass loop; (2C) reverse current charge loop; and (2D) reverse current bypass loop.
Figure 2B:
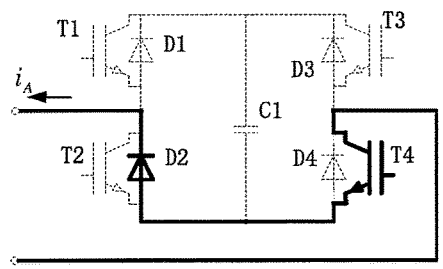
Figure 2C:
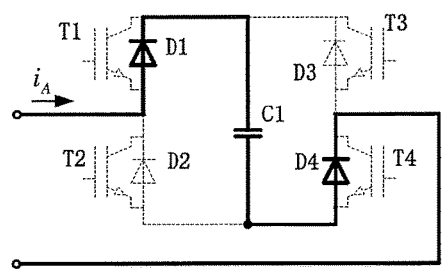
Figure 2D:
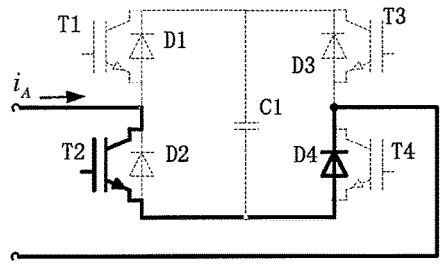
Figure 3A:
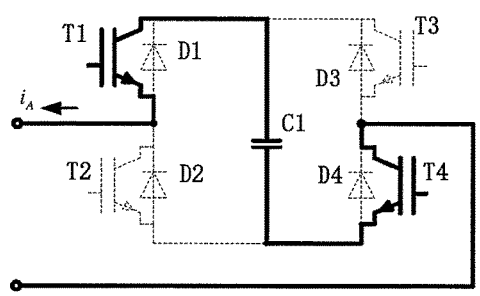
FIGS. 3A-3D are schematic diagrams of various operating conditions of a full-bridge submodule unit at a stage 2 according to the present invention: (3A) forward current discharge loop; (3B) forward current bypass loop; (3C) reverse current charge loop; and (3D) reverse current bypass loop.
Figure 3B:
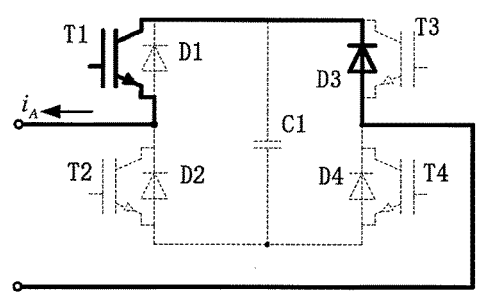
Figure 3C:
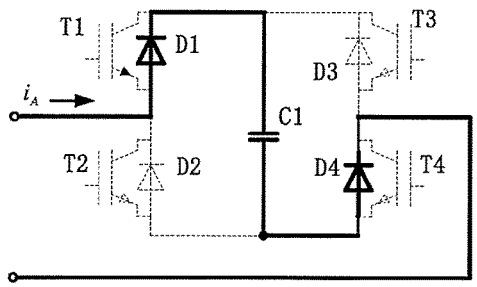
Figure 3D:
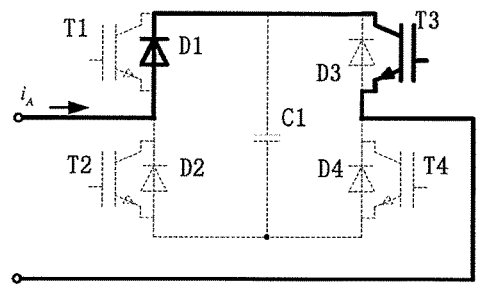

Further, the drive signal modulation method of a modular multilevel converter includes the following steps:

1) a capacitor discharge state in the first mode: an on-signal is applied to the switching transistors T1 and T4, an off-signal is applied to the switching transistors T2 and T3, and the switching transistors T1 and T4 are turned on and an energy storage element C1 is discharged, at a forward current, as shown in FIG. 2A;

2) a forward bypass state in the first mode: an on-signal is applied to the switching transistors T2 and T4, an off-signal is applied to the switching transistors T1 and T3, and the freewheel diode D2 and the switching transistor T4 are turned on and the full-bridge submodule unit is bypassed, at a forward current, as shown in FIG. 2B;

3) a capacitor discharge state in the first mode: an on-signal is applied to the switching transistors T1 and T4, an off-signal is applied to the switching transistors T2 and T3, and the freewheel diodes D1 and D4 are turned on and the energy storage element C1 is charged, at a reverse current, as shown in FIG. 2C;

4) a reverse bypass state in the first mode: an on-signal is applied to the switching transistors T2 and T4, an off-signal is applied to the switching transistors T1 and T3, and the switching transistor T2 and the freewheel diode D4 are turned on and the full-bridge submodule unit is bypassed, at a reverse current, as shown in FIG. 2D;

5) a capacitor discharge state in the second mode: an on-signal is applied to the switching transistors T1 and T4, an off-signal is applied to the switching transistors T2 and T3, and the switching transistors T1 and T4 are turned on and the energy storage element C1 is discharged, at a forward current, as shown in FIG. 3A;

6) a forward bypass state in the second mode: an on-signal is applied to the switching transistors T1 and T3, an off-signal is applied to the switching transistors T2 and T4, and the switching transistor T1 and the freewheel diode D3 are turned on and the full-bridge submodule unit is bypassed, at a forward current, as shown in FIG. 3B;

7) a capacitor discharge state in the second mode: an on-signal is applied to the switching transistors T1 and T4, an off-signal is applied to the switching transistors T2 and T3, and the freewheel diodes D1 and D4 are turned on and the energy storage element C1 is charged, at a reverse current, as shown in FIG. 3C; and 8) a reverse bypass state in the second mode: an on-signal is applied to the switching transistors T1 and T3, an off-signal is applied to the switching transistors T2 and T4, and the freewheel diode D1 and the switching transistor T3 are turned on and the full-bridge submodule unit is bypassed, at a reverse current, as shown in FIG. 3D.

Embodiment 2

The present embodiment provides a fault isolation method of a submodule unit, the submodule unit being a full-bridge submodule unit. When the drive signal modulation method of a modular multilevel converter in the embodiment 1 is used to perform modulation, if the second power semiconductor switch in the full-bridge submodule unit breaks down or if a drive circuit of the second power semiconductor switch breaks down, the broken-down second power semiconductor switch is isolated by changing the mode of the drive signal modulation, while the full-bridge submodule unit does not stopping running and operates in the second mode, as shown in FIGS. 3A-3D.

Embodiment 3

The present embodiment provides a fault isolation method of a submodule unit, the submodule unit being a full-bridge submodule unit. When the drive signal modulation method of a modular multilevel converter described in the embodiment 1 is used to perform modulation, if the third power semiconductor switch in the full-bridge submodule unit breaks down or if a drive circuit of the third power semiconductor switch breaks down, the broken-down third power semiconductor switch is isolated by changing the mode of the drive signal modulation, while the full-bridge submodule unit does not stopping running and operates in the first mode, as shown in FIGS. 2A-2D.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of modulating a drive signal for a modular multilevel converter, the modular multilevel converter comprising at least one bridge arm, the bridge arm comprising at least one full-bridge submodule unit, the full-bridge submodule unit comprising a first power semiconductor switch, a second power semiconductor switch, a third power semiconductor switch and a fourth power semiconductor switch, the method comprising:

the full-bridge submodule unit operates in two alternate operation modes, designated a first mode and a second mode;

firstly enters the first mode, then enters the second mode, re-enters the first mode and so on;

or firstly enters the second mode, then enters the first mode, re-enters the second mode and so on;

in the first mode, an alternate drive signal is applied to the first power semiconductor switch and the second power semiconductor switch, such that the first power semiconductor switch and the second power semiconductor switch are turned on alternately in the same time sequence, while a complementary drive signal is applied to the third power semiconductor switch and the fourth power semiconductor switch, such that the third power semiconductor switch remains in an off state and the fourth power semiconductor switch remains in an on state in the time sequence of the alternate turning-on of the first power semiconductor switch and the second power semiconductor switch; and in the second mode, an alternate drive signal is applied to the third power semiconductor switch and the fourth power semiconductor switch, such that the third power semiconductor switch and the fourth power semiconductor switch are turned on alternately in the same time sequence, while a complementary drive signal is applied to the first power semiconductor switch and the second power semiconductor switch, such that the first power semiconductor switch remains in an on state and the second power semiconductor switch remains in an off state in the time sequence of the alternate turning-on of the third power semiconductor switch and the fourth power semiconductor switch.

2. The method of modulating the drive signal for a modular multilevel converter of claim 1, wherein the first power semiconductor switch comprises a switching transistor T1 and a freewheel diode D1 in anti-parallel with the switching transistor T1; the second power semiconductor switch comprises a switching transistor T2 and a freewheel diode D2 in anti-parallel with the switching transistor T2; the third power semiconductor switch comprises a switching transistor T3 and a freewheel diode D3 in anti-parallel with the switching transistor T3; and the fourth power semiconductor switch comprises a switching transistor T4 and a freewheel diode D4 in anti-parallel with the switching transistor T4.

3. The method of modulating a drive signal for a modular multilevel converter of claim 1, wherein each of the switching transistors T1, T2, T3, and T4 is an IGBT, an IGCT, a GTO, or a MOSFET.

4. The method of modulating a drive signal for a modular multilevel converter of claim 2, comprising the following steps:
1) a capacitor discharge state in the first mode: an on-signal is applied to the switching transistors T1 and T4, an off-signal is applied to the switching transistors T2 and T3,
and the switching transistors T1 and T4 are turned on and an energy storage element C1 is discharged, at a forward current;
2) a forward bypass state in the first mode: an on-signal is applied to the switching transistors T2 and T4, an off-signal is applied to the switching transistors T1 and T3, and the freewheel diode D2 and the switching transistor T4 are turned on and the full-bridge submodule unit is bypassed, at a forward current;
3) a capacitor discharge state in the first mode: an on-signal is applied to the switching transistors T1 and T4, an off-signal is applied to the switching transistors T2 and T3, and the freewheel diodes D1 and D4 are turned on and the energy storage element C1 is charged, at a reverse current;
4) a reverse bypass state in the first mode: an on-signal is applied to the switching transistors T2 and T4, an off-signal is applied to the switching transistors T1 and T3, and the switching transistor T2 and the freewheel diode D4 are turned on and the full-bridge submodule unit is bypassed, at a reverse current;

5) capacitor discharge state in the second mode: an on-signal is applied to the switching transistors T1 and T4, an off-signal is applied to the switching transistors T2 and T3, and the switching transistors T1 and T4 are turned on and the energy storage element C1 is discharged, at a forward current;
6) a forward bypass state in the second mode: an on-signal is applied to the switching transistors T1 and T3, an off-signal is applied to the switching transistors T2 and T4, and the switching transistor T1 and the freewheel diode D3 are turned on and the full-bridge submodule unit is bypassed, at a forward current;
7) a capacitor discharge state in the second mode: an on-signal is applied to the switching transistors T1 and T4, an off-signal is applied to the switching transistors T2 and T3, and the freewheel diodes D1 and D4 are turned on and the energy storage element C1 is charged, at a reverse current; and
8) a reverse bypass state in the second mode: an on-signal is applied to the switching transistors T1 and T3, an off-signal is applied to the switching transistors T2 and T4, and the freewheel diode D1 and the switching transistor T3 are turned on and the full-bridge submodule unit is bypassed, at a reverse current.

5. A method of isolating a fault of a submodule unit, wherein the submodule unit is the at least one full-bridge submodule unit, the method comprising: when the method of modulating a drive signal for a modular multilevel converter of claim 1 is used to perform modulation, if a second power semiconductor switch or a third power semiconductor switch in the at least one full-bridge submodule unit breaks down or if a drive circuit of the second power semiconductor switch or the third power semiconductor switch breaks down, the broken-down power semiconductor switch is isolated by changing the mode of the drive signal modulation, while the at least one full-bridge submodule unit does not stop operating.

6. The method of modulating a drive signal for a modular multilevel converter of claim 2, wherein each of the switching transistors T1, T2, T3, and T4 is an IGBT, an IGCT, a GTO, or a MOSFET.

7. A method of isolating a fault of a submodule unit, the submodule unit is the at least one full-bridge submodule unit, the method comprising: when the method of modulating a drive signal for a modular multilevel converter of claim 2 is used to perform modulation, if a second power semiconductor switch or a third power semiconductor switch in the at least one full-bridge submodule unit breaks down or if a drive circuit of the second power semiconductor switch or the third power semiconductor switch breaks down, the broken-down power semiconductor switch is isolated by changing the mode of the drive signal modulation, while the at least one full-bridge submodule unit does not stop operating.

8. A method of isolating a fault of a submodule unit, the submodule unit is the at least one full-bridge submodule unit, the method comprising: when the drive signal modulation method of a modular multilevel converter of claim 3 is used to perform modulation, if a second power semiconductor switch or a third power semiconductor switch in the at least one full-bridge submodule unit breaks down or if a drive circuit of the second power semiconductor switch or the third power semiconductor switch breaks down, the broken-down power semiconductor switch is isolated by changing the mode of the drive signal modulation, while the at least one full-bridge submodule unit does not stop operating.

9. A method of isolating a fault of a submodule unit, the submodule unit is at least one full-bridge submodule unit, the method comprising: when the drive signal modulation method of a modular multilevel converter of claim 4 is used to perform modulation, if a second power semiconductor switch or a third power semiconductor switch in the at least one full-bridge submodule unit breaks down or if a drive circuit of the second power semiconductor switch or the third power semiconductor switch breaks down, the broken-down power semiconductor switch is isolated by changing the mode of the drive signal modulation, while the at least one full-bridge submodule unit does not stop operating.

10. A method of isolating a fault of a submodule unit, the submodule unit is the at least one full-bridge submodule unit, the method comprising: when the drive signal modulation method of a modular multilevel converter of claim 6 is used to perform modulation, if a second power semiconductor switch or a third power semiconductor switch in the at least one full-bridge submodule unit breaks down or if a drive circuit of the second power semiconductor switch or the third power semiconductor switch breaks down, the broken-down power semiconductor switch is isolated by changing the mode of the drive signal modulation, while the at least one full-bridge submodule unit does not stop operating.

* * * * *